United States Patent [19]
Herbert

[11] Patent Number: 5,388,256
[45] Date of Patent: Feb. 7, 1995

[54] TRANSACTION PROCESSING DATABASE SYSTEM WITH SHARED WORK-IN-PROGRESS STORE FOR LOGGING DATABASE CHANGES

[75] Inventor: Richard Herbert, Stoke-On-Trent, Great Britain

[73] Assignee: International Computers Limited, London, England

[21] Appl. No.: 890,932

[22] Filed: May 29, 1992

[30] Foreign Application Priority Data

Jul. 27, 1991 [GB] United Kingdom ............... 9116268

[51] Int. Cl.$^6$ ............................................ G06F 11/00
[52] U.S. Cl. ............................ 395/600; 364/DIG. 1; 395/575; 395/700
[58] Field of Search ................. 395/600, 575, 700; 364/134

[56] References Cited

U.S. PATENT DOCUMENTS

| | | | |
|---|---|---|---|
| 4,811,388 | 3/1989 | Westerhof et al. | 379/229 |
| 5,201,044 | 4/1993 | Frey, Jr. et al. | 395/575 |
| 5,257,367 | 10/1993 | Goodlander et al. | 395/600 |
| 5,258,982 | 11/1993 | Britton et al. | 370/110.1 |
| 5,291,594 | 3/1994 | Sekiguchi et al. | 395/600 |

FOREIGN PATENT DOCUMENTS 0098928  1/1984  European Pat. Off. .

OTHER PUBLICATIONS

Lindsay, "Computation and Communication in R*: A Distributed Database Manager", ACM Transactions on Computer Systems, vol. 2, No. 1, Feb. 1984, pp. 24–38.

*Primary Examiner*—Thomas G. Black
*Assistant Examiner*—Cuan Pham
*Attorney, Agent, or Firm*—Lee, Mann, Smith, McWilliams, Sweeney & Ohlson

[57] ABSTRACT

A data processing system includes at least one transaction processing application and a plurality of data managers which can be accessed by the transaction processing application. Each data manager is responsible for managing a separate data base. The system further includes a work-in-progress store and a work-in-progress store manager for managing the work-in-progress store. Whenever the transaction processing application instructs a data manager to perform an update, the data manager passes information concerning the update to the work-in-progress store manager which records this information in the work-in-progress store, and whenever the application completes a transaction, the data managers perform updates to their respective databases and the work-in-progress store manager is instructed to discard the contents of the work-in-progress store relating to this transaction.

2 Claims, 2 Drawing Sheets

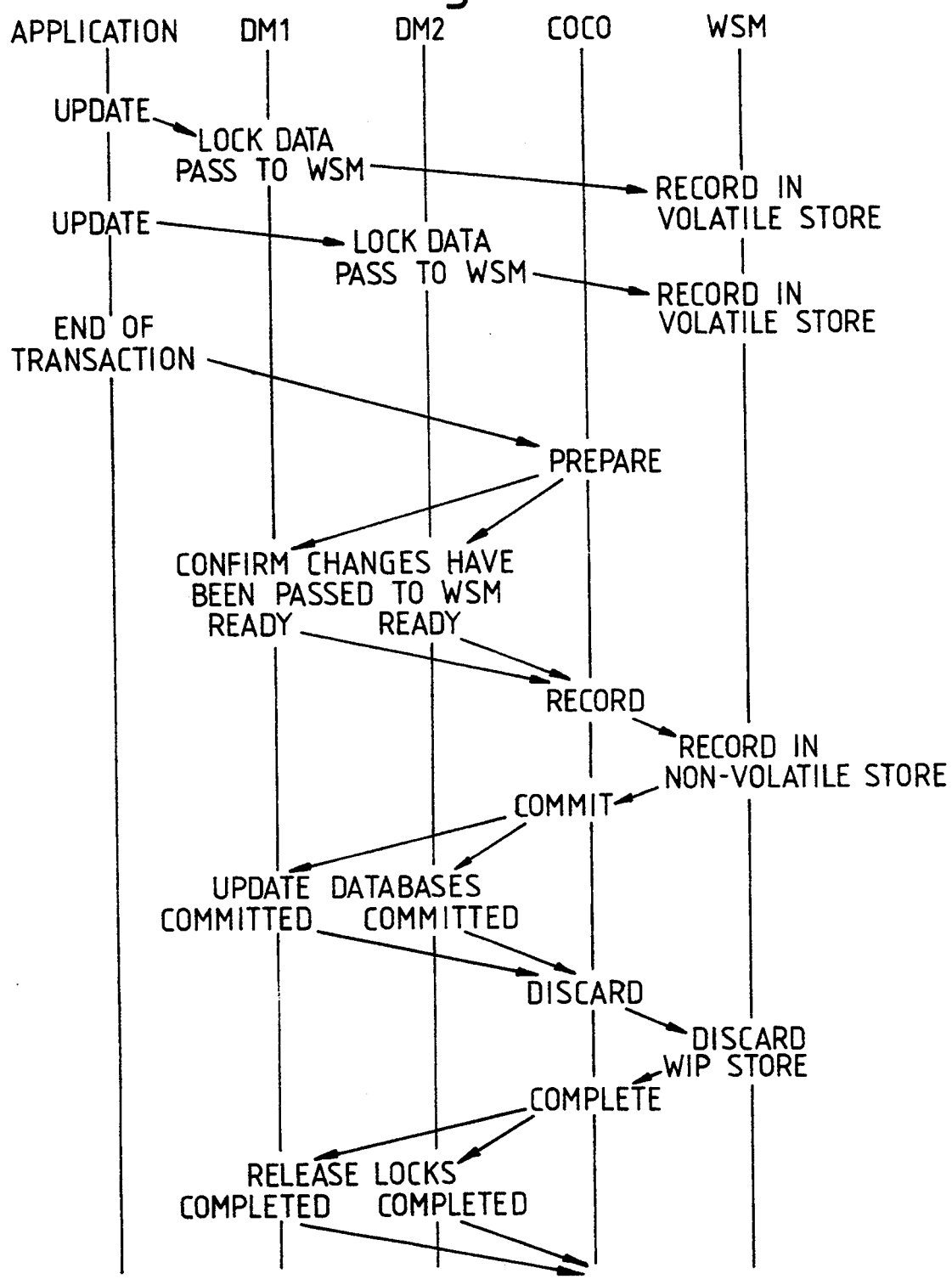

TRANSACTION PROCESSING DATABASE SYSTEM WITH SHARED WORK-IN-PROGRESS STORE FOR LOGGING DATABASE CHANGES

BACKGROUND OF THE INVENTION

This invention relates to data processing systems and is particularly concerned with data processing systems involving transaction processing and database management.

Support for transaction processing requires the ability to ensure that the effects of data updates associated with a transaction are atomic; that is either all updates are applied or none. This atomicity must be achieved irrespective of failure during the transaction. This capability is often achieved by writing the updates associated with the transaction to a separate log file before they are applied to the database. Only if all of the updates to be applied are secured in the log file is the transaction completed by the data manager applying the updates to the database. Once all of the updates have been applied the transaction must be marked as complete in the log file.

Where a transaction involves more than one such data manager the data managers defer to a separate coordinator to control the progress of the transaction. As before each data manager writes its updates to a log file instead of updating the database. When the user work for the transaction ends the coordinator requests that each data manager puts itself in a state where it is prepared to commit or rollback the transaction (by writing to its own log). When all of the involved data managers have reached this state the coordinator secures the decision to commit the transaction in its own log and tells each data manager to commit any changes. Before replying that it has completed, each data manager records in its own log that it has completed. When all data managers have completed the coordinator records the completion of the transaction in its own log. Each transaction therefore involves 2+2n log writes (where n is the number of data managers involved in the transaction).

The object of the present invention is to provide an improved data processing system in which the number of writes to such log files is reduced.

SUMMARY OF THE INVENTION

According to the present invention there is provided a data processing system including at least one transaction processing application and a plurality of data managers which can be accessed by the transaction processing application, each data manager being responsible for managing a separate data base, wherein the system further includes a work-in-progress store and a work-in-progress store manager for managing the work-in-progess store, and wherein whenever the transaction processing application instructs a data manager to perform an update, the data manager passes information concerning the update to the work-in-progress store manager which records this information in the work-in-progress store, and whenever the application completes a transaction, the database managers perform updates to their respective databases and the work-in-progress store manager is instructed to discard the contents of the work-in-progress store relating to this transaction.

Thus, it can be seen that when a transaction is completed, the data managers do not have to access individual log files to perform any logging action; only a single logging write is required to remove the record of the transaction from the work-in-progress store.

BRIEF DESCRIPTION OF THE DRAWINGS

FIG. 2 is a sequence diagram illustrating the operation of the system.

DESCRIPTION OF AN EMBODIMENT OF THE INVENTION

Figure 1:
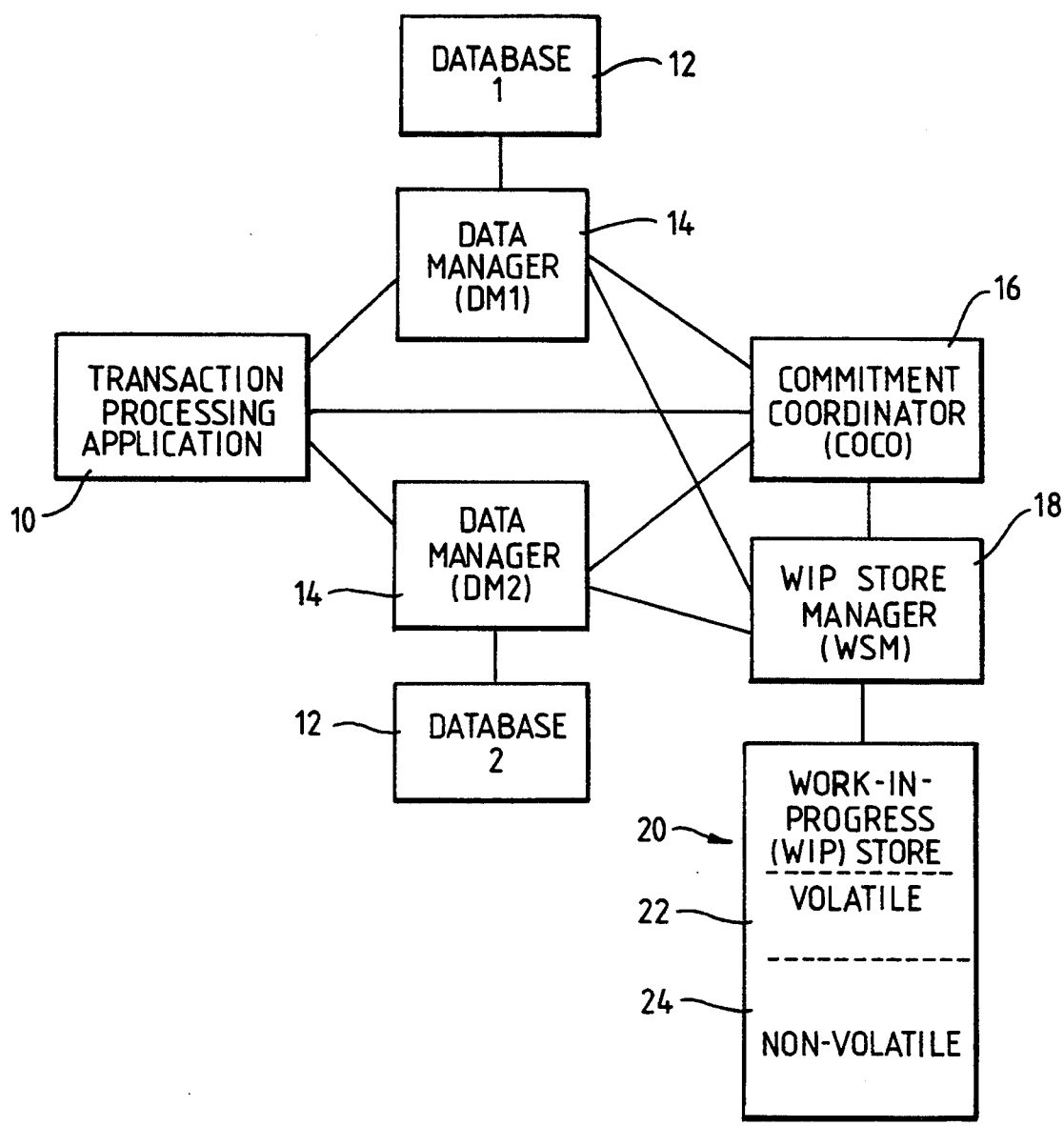
FIG. 1 is a schematic block diagram of a data processing system in accordance with the invention.

One data processing system in accordance with the invention will now be described by way of example with reference to the accompanying drawings.

Referring to FIG. 1, the system includes a number of application programs 10 which run in a transaction processing environment. (In this example, only one application program is shown, but in general there may be many such programs in the system).

The application program 10 can access two databases 12 (DATABASE 1 and DATABASE 2). Each of these databases has its own data manager 14 (DM1 and DM2).

The applications and the data managers all communicate with a coordination controller (COCO) 16. The data managers also communication with a work-in-progress store manager (WSM) 18, which controls a work-in-progress (WIP) store 20.

In this embodiment the data managers, coordination controller and work-in-progress store manager are all software components which run on the same host processor as the application programs. For example, the host processor may be an ICL Series 39 system running under the VME operating system.

Communication between these components is achieved by a messaging service. Details of this messaging service form no part of the present invention and so will not be described herein.

The WIP store comprises two portions: a volatile store 22, which consists of an area of the main RAM of the system, and a non-volatile store 24, which consists of an area of disc store.

Referring now to FIG. 2, this shows a typical sequence of operations of the above components.

In this example, it is assumed that the application program performs a transaction, in which it updates both the databases in turn. The data updates associated with a transaction are atomic, in that, at the end of the transaction either all the updates associated with the transaction must be applied to the respective databases, or none, depending on whether or not the transaction is deemed to have been successfully completed.

As shown in FIG. 2, whenever the application generates a database update, it sends a message to the appropriate data manager (DM1 or DM2). The data manager then sets locks on the data in the database, so as to prevent any other transaction from updating the data while the present transaction is in progress, and passes details of the update to the work-in-progress store manager WSM. The WSM then writes details of the changes to be made to the data into the volatile area of the WIP store.

When the user work for the transaction is complete, the application sends a message to the COCO. The COCO then sends a PREPARE message to each of the data managers (DM1, DM2) involved in the transaction.

In response to this PREPARE message, each data manager confirms that all the changes in the data have been passed to the WSM, and returns a READY message to the COCO.

When the COCO has received READY messages from each of the data managers, it sends a RECORD message to the WSM, instructing it to record all the changes to the data (currently held in volatile store) into the nonvolatile portion of the WIP store. When the WSM has done this, the COCO sends a COMMIT message to each of the data managers involved in the transaction.

In response to this COMMIT message, each data manager applies the updates to its database. No logging action is required. When it has done this, each data manager returns a COMMITTED message to the COCO.

When the COCO has received a COMMITTED message from each of the data managers, it sends a DISCARD message to the WSM, instructing it to discard the changes logged in the non-volatile portion of the WIP store in respect of this transaction. (These are no longer required since the databases have now been updated). When the WSM has done this, the COCO sends a COMPLETE message to each of the data managers involved in the transaction.

When the data managers receive the COMPLETE message, they release any locks applied to their respective databases, and return a COMPLETED message to the COCO, informing it that the transaction is now complete.

Conveniently, the WIP store is implemented as a serial file. For each transaction, two records are written to the file: one containing all the data manager updates and the COCO's commit decision marker; the other indicating that the transaction is complete. A garbage collection process is periodically applied to this file to release any records which relate to transactions that have been both committed and completed.

If the system fails while transactions are outstanding, the WSM removes any records from the WIP store file that have been only partially written. The COCO then completes all commitment units for which the commit record has been completed but the completion marker has not.

In a modification of the system described above, if all accesses to data are by way of the WIP store, the writing of the data to the non-volatile part of the WIP store may be delayed, so that only one I/O operation is required per transaction, rather than two.

I claim:

1. A data processing system comprising:
   (a) at least one transaction processing application;
   (b) a plurality of data managers, accessible by the transaction processing application, said data managers being responsible for managing respective databases;
   (c) a work-in-progress store, common to and shared between all said data managers, said work-in-progress store comprising a volatile portion and a non-volatile portion;
   (d) a work-in-progress store manager, coupled to the data managers and to said work-in-progress store, the work-in-progress store manager comprising means for receiving update information relating to a transaction from said data managers and for recording said update information in said volatile portion of said work-in-progress store; and
   (e) a commitment co-ordinator, coupled to said transaction processing application, to said data managers and to said work-in-progress store manager;
   (f) said commitment co-ordinator comprising means for receiving messages from all of said data managers, confirming that all update information relating to said transaction has been recorded in said work-in-progress store, for instructing the work-in-progress store manager to record said update information relating to said transaction in said non-volatile portion of said work-in-progress store, and for then sending messages to all said data managers, instructing the data managers to update their respective databases; and
   (g) said commitment co-ordinator also comprising means for receiving messages from all of said data managers, confirming that said data managers have all updated their respective databases, and for then instructing said work-in-progress store manager to discard said update information relating to said transaction from said work-in-progress store.

2. In a data processing system including at least one transaction processing application, a plurality of data managers, accessible by the transaction processing application, said data managers being responsible for managing respective data bases, and a work-in-progress store, common to and shared between all said data managers, said work-in-progress store comprising a volatile portion and a non-volatile portion, a method of coordinating commitment of a transaction, the method comprising the steps:
   (i) recording update information relating to a transaction, in said volatile portion of said work-in-progress store;
   (ii) when all update information relating to said transaction has been recorded in said work-in-progress store, recording said update information relating to said transaction in said non-volatile portion of said work-in-progress store, and then causing said data managers to update their respective databases; and
   (iii) when said data managers have all updated their respective databases, discarding said update information relating to said transaction from said work-in-progress store.

\* \* \* \* \*